United States Patent [19]
Lee

[11] Patent Number: 5,431,489
[45] Date of Patent: Jul. 11, 1995

[54] HYDRAULIC ANTI-SKID BRAKING SYSTEMS FOR AUTOMOBILES

[75] Inventor: Jong W. Lee, Seoul, Rep. of Korea

[73] Assignee: Mando Machinery Corporation, Gunpo, Rep. of Korea

[21] Appl. No.: 988,228

[22] Filed: Dec. 9, 1992

[30] Foreign Application Priority Data

| Jun. 12, 1992 [KR] | Rep. of Korea | 92-10220 |
| Jul. 2, 1992 [KR] | Rep. of Korea | 92-11760 |
| Oct. 26, 1992 [KR] | Rep. of Korea | 92-19771 |

[51] Int. Cl.$^6$ ............................................. B60T 8/32
[52] U.S. Cl. ........................ 303/117.1; 303/116.2; 303/119.2; 303/115.4
[58] Field of Search .............. 303/117.1, 119.2, 119.1, 303/113.2, 113.1, 116.1, 116.2, 116.3, 116.4, 900, 901, 115.1, 115.2, 115.3, 115.4, 84.1, 84.2; 137/596.17; 91/433

[56] References Cited

U.S. PATENT DOCUMENTS

| 3,514,161 | 5/1970 | Frayer . | |
| 3,661,427 | 5/1972 | Hodge . | |
| 3,666,328 | 5/1972 | Williams . | |
| 3,671,085 | 6/1972 | Pasak et al. . | |
| 3,672,731 | 6/1972 | Koivunen . | |
| 3,724,914 | 4/1973 | Skoyles | 303/116.4 |
| 3,726,568 | 4/1973 | Krugler, Jr. . | |
| 3,880,476 | 4/1975 | Belart et al. | 303/119.2 |
| 3,909,073 | 9/1975 | De Gennes | 303/115.2 |
| 3,981,543 | 9/1976 | Atkins . | |
| 3,994,538 | 11/1976 | Farr . | |
| 4,350,396 | 9/1982 | Mortimer | 303/115.4 |
| 4,500,138 | 2/1985 | Mizusawa et al. . | |
| 4,715,666 | 12/1987 | Farr | 303/116.4 |
| 4,779,935 | 10/1988 | Kuwana et al. . | |
| 4,915,459 | 4/1990 | Hashida et al. | 303/117.1 |
| 5,004,301 | 4/1991 | Yamada et al. | 303/115.4 |
| 5,018,797 | 5/1991 | Takata | 303/119.2 |
| 5,076,538 | 12/1991 | Mohr et al. | 303/119.2 |
| 5,094,512 | 3/1992 | Kohno et al. | 303/117.1 |
| 5,209,552 | 5/1993 | Reinartz et al. . | |
| 5,213,399 | 5/1993 | Burgdorf et al. . | |
| 5,221,129 | 6/1993 | Takasaki et al. | 303/117.1 |
| 5,234,030 | 8/1993 | Kervagoret et al. | 137/596.17 |
| 5,244,261 | 9/1993 | Ohe | 303/115.4 |
| 5,312,175 | 5/1994 | Ando et al. | 303/117.1 |

FOREIGN PATENT DOCUMENTS

| 507492 | 10/1992 | European Pat. Off. | 303/117.1 |
| 63-78856 | 4/1988 | Japan | 303/117.1 |
| 91/05689 | 5/1991 | WIPO | 303/116.2 |

*Primary Examiner*—Douglas C. Butler
*Attorney, Agent, or Firm*—Hughes, Multer & Schacht

[57] ABSTRACT

An hydraulic anti-skid braking system for automobiles, comprising a master cylinder, a brake, a flow control valve, a solenoid valve, a piston pump, and an expander cylinder. During a skid condition, the solenoid valve is opened, and a the pump draws fluid from the brake through the solenoid valve and delivers fluid to the flow control valve to shut off a hydraulic connection between the master cylinder and the brake, while reducing fluid pressure to the brake. When pressure is equalized between the brake and the hydraulic line that is connected to the master cylinder, the control valve returns to its initial operation position.

12 Claims, 8 Drawing Sheets

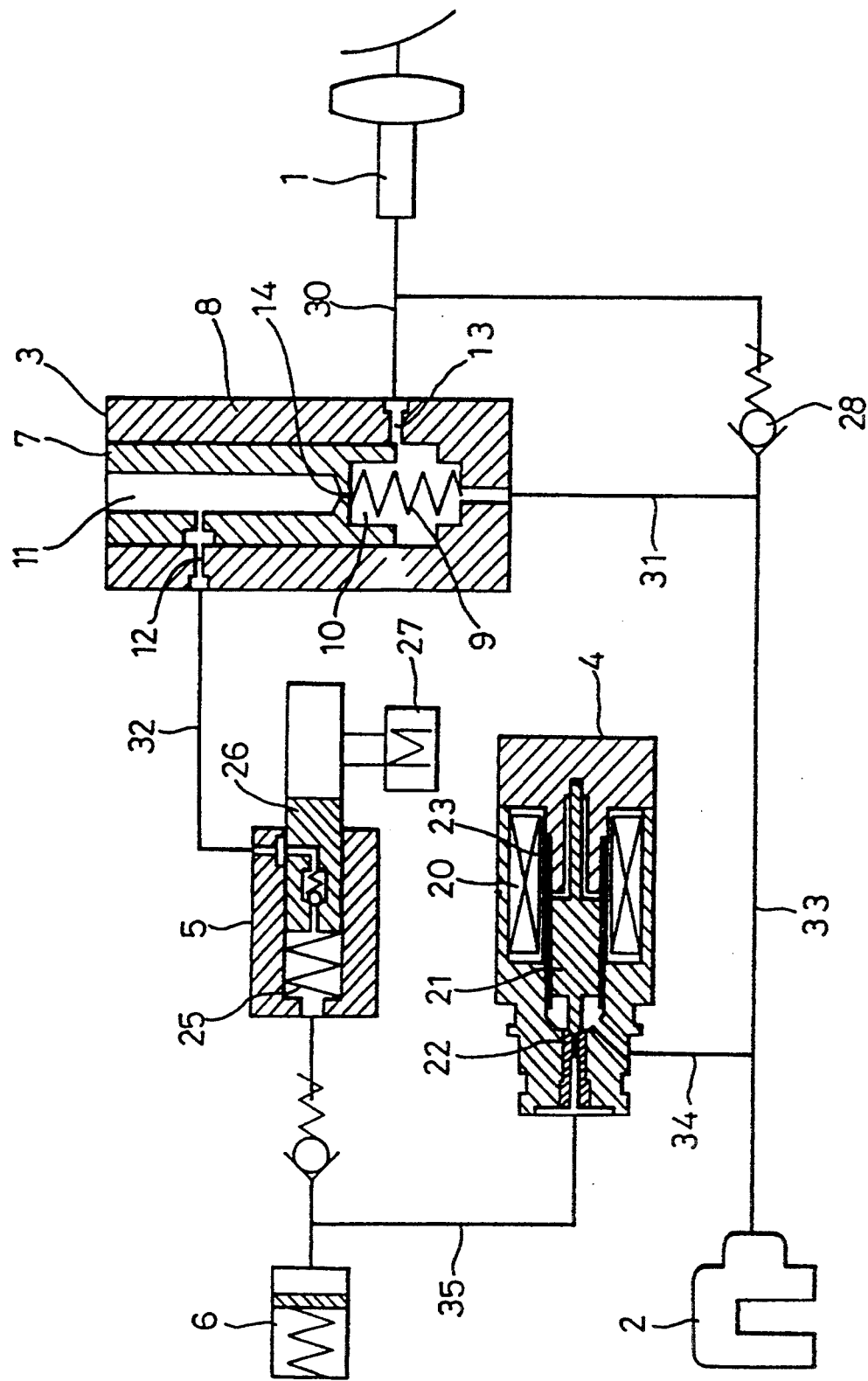

HYDRAULIC ANTI-SKID BRAKING SYSTEMS FOR AUTOMOBILES

FIELD OF THE INVENTION

The present invention relates to hydraulic anti-skid braking systems for automobiles, and particularly, to hydraulic anti-skid braking systems for automobiles for improving the smooth operation of the brake pedal, preventing the accidental spinning phenomena with respect to a given automobile due to the differences between the braking forces applied to the right and left wheels thereto, as well as performing a traction control function by affording a simple additional device to the system.

DESCRIPTION OF THE PRIOR ART

As illustrated in FIGS. 1A and 1B, the prior art is disclosed in U.S. Pat. No. 4,715,666 which comprises a master cylinder 1, a modulator 3 which consists of a solenoid valve 5 and a flow control valve 6, a piston pump 8, a brake 2, and so on.

During a normal braking operation, which is called a non-skid condition of the wheels, this disclosure shows that because the solenoid valve 5 cuts off passage 16 leading to the inlet of pump 8 by means of a spring 11a, the hydraulic pressure generated in the master cylinder 1 is directly applied to the brake 2 through the spool 43 in the flow control valve 6 so as to cause the braking operation of the brake 2.

During the second braking operation where a reduced braking pressure is required due to an increase in the slip rate of a wheel travelling over a low friction road surface, the control module 7 activates a solenoid 10 and causes a solenoid valve head 11 to move away from the seating so that the passage between the flow control valve 6 and the piston pump 8 is opened.

Simultaneously, the piston pump 8 is driven by the electric motor 24.

As a result of the operation of the piston pump 8, the hydraulic pressure is reduced at a pressure chamber 52 which is in communication with the pump 8 through a passage 16 and thus, the spool 43 moves toward the left side against the force in a spring 47 and the connection between the brake 2 and the master cylinder 1 is isolated and, ultimately, the hydraulic pressure in the brake 2 is decreased through the passage 14.

As the pressure decrease continues and the slip rate of the wheel is reduced to below a predetermined value, the control module 7 operates to de-activate the solenoid 10 and then the solenoid valve 11 cuts off the passage located between the pump 8 and the brake 2.

Accordingly, the spool 43 begins to move toward the right side as the pressure increases at the pressure chamber 52.

The spool 43 moves only until the moment when passage 51 is open and is positioned where the pressure drops across a fixed orifice 46 and the force in the spring 47 are in balance with each other.

Also, the rate of the pressure increase in the brake is adjusted because flow rate fed to the brake 2 is determined and constantly maintained by the size of the orifice 46 and the pressure differential between both chambers across the orifice 46.

If the pressure increase continues and the pressure applied to the brake 2 becomes equal to the pressure at the master cylinder 1, the pressure equilibrium in both ends of the spool 43 is broken, and the spool 43 is returned to its initial position, namely, the end of the right side.

Therefore, the system operates in the normal braking condition.

In the event that a decrease in the braking pressure is required again in the midst of becoming higher in braking pressure, the braking pressure is properly modulated by repeating the sequence described above with the activation of the solenoid 10 and the pump 8.

However, the problems of the prior art described above are as follows.

Because the piston pump 8 and the master cylinder 1 are openly connected to each other through the passage 31, where the piston 27 by the operation of the pump 8 performs reciprocating movements, fluid pulses generated by intermittent displacements of the piston 27 travel to the master cylinder 1, which causes kicking-back phenomena against the brake pedal.

Further, it is difficult to add to the anti-skid braking system a traction control system which improves the road-holding ability by automatically controlling the braking pressure during accelerating movements of the automobile without the operation of the brake pedal by the driver.

For that reason, attempts have been made to create an apparatus which can fulfill both the anti-skid function and the traction control function.

The present invention was devised to resolve these problems.

SUMMARY OF THE INVENTION

It is an object of the present invention to provide an hydraulic anti-skid braking system which forms closed hydraulic circuits.

It is another object of the present invention to provide an hydraulic anti-skid braking system having a flow control valve which prevents the fluid pulses caused by the movements of a piston pump from being transmitted to a master cylinder, so that the kicking-back phenomena is drastically diminished.

It is still another object of the present invention to provide an hydraulic anti-skid braking system having a closed hydraulic circuit which is adapted to each paired group of left and right wheels in order to share some components corresponding to the system, so that the differences of the braking pressure between the right and left wheels is restrained from increasing too fast, thereby preventing the accidental spinning phenomena due to abrupt braking of an automobile.

It is still another object of the present invention to provide an hydraulic anti-skid braking system in which a flow control valve and a solenoid valve of the closed hydraulic circuit system are integrated with each other, thereby minimizing or compacting its requisite body size.

It is still another object of the present invention to provide an hydraulic anti-skid braking system which permits the hydraulic pressure, which is generated at a master cylinder in the closed hydraulic circuit system and which is applied to a brake through a fluid passage formed in pairs diagonally with respect to four wheels, to perform the braking function, thereby leading to a safer braking method.

The hydraulic anti-skid braking system according to the present invention, during a normal braking operation, namely, a non-skid condition, brakes the automobile as a result of the hydraulic pressure that is generated at a master cylinder and applied directly to a brake through a port in the side of the flow control valve.

As the second aspect of operation, in the event that the slip rate in any wheel exceeds a definite value which makes it necessary to decrease the braking pressure on a given wheel, a piston pump operates initially, and then a solenoid valve in communication with the passage leading to the brake is opened.

Accordingly, the hydraulic pressure applied to the brake is decreased by transmitting the hydraulic fluid at the brake to a flow control valve via the solenoid valve, an expander chamber, and the piston pump, in turn.

Also, the fluid transmitted to the flow control valve pushes a spool downward, which is moved by the force in a spring and the pressure drops across an orifice, thereby causing the inlet of the flow control valve receiving the fluid from the master cylinder to be closed.

That is, when the braking pressure is controlled to decrease or to increase slowly, the fluid pathway of the flow control valve connected to the master cylinder is closed, and the fluid pulses generated by the piston pump do not travel to the master cylinder because the system forms a closed hydraulic circuit with circulation to the solenoid valve, the expander chamber, the piston pump, and the flow control valve.

In the layout of the hydraulic anti-skid braking system illustrated in the first embodiment, a flow control valve of a simple construction comprises a housing, a spool combined with a spring in the housing, a port in communication with a piston pump over the housing, a port in communication with a master cylinder on the side of the housing, and a port in communication with a brake in the lower end of the housing.

Because the port in communication with the master cylinder is located at the side of the housing, the hydraulic pressure applied in the master cylinder is transmitted to the brake without abnormal movements, even though a sudden increase in the hydraulic pressure may occur in the master cylinder.

As illustrated in the second embodiment, the hydraulic anti-skid braking system is modified from the system illustrated in the first embodiment, in which a flow control valve comprises a housing, a spool combined with a spring in the housing, a port in communication with a piston pump over the housing, each port in communication with a master cylinder and a brake respectively on the side of the housing, and a pressure chamber integrated with a solenoid valve below the housing.

It is noted that the flow control valve is configured to form the spool having a fluid passage gradually enlarged for smoothly discharging fluid from the brake into the pressure chamber, thereby minimizing the fluid pulses and reducing noises and errors in automobile control.

As a result of the simple construction of the flow control valves as described above, the organization of each system becomes very simple and easy and thus rapid modulation of the braking pressure is possible.

Further, because the piston pump is operated in advance before a slip rate develops requiring a decrease of the braking pressure, the system can swiftly reduce the braking pressure when the slip rate makes it necessary to decrease the braking pressure.

Since the construction of the solenoid valve illustrated in the first embodiment allows the internal pressure of the tube to be equally maintained with that of the brake, the more the braking pressure increases, the more a plunger in the solenoid valve is pushed in the direction of the valve seat.

Accordingly, the size of the solenoid valve can be minimized, and the solenoid valve can be operated at a rapid speed, because the solenoid valve used for the present invention can seal both passages connected to the solenoid valve more assuredly so that the spring of the solenoid valve requires only enough force to move the plunger.

The third embodiment, an hydraulic anti-skid braking system applied to four wheels of automobiles utilizing the first embodiment, has one separate hydraulic circuit for braking the front-right and the front-left wheels and another separate hydraulic circuit for braking the rear-right and the rear-left wheels; and each hydraulic circuit consists of a common expander chamber, a common piston pump, and a common chamber for decreasing the pressure pulsation, and two flow control valves for braking the right and left wheels of the front and rear sides respectively.

By the organization of the system as described above, when the slip rate of a wheel is increased and the braking pressure is required to be dropped down, the fluid discharged from the piston pump pushes the spool downward in the flow control valve of the wheel.

Simultaneously, the spool in the flow control valve of the other wheel is pushed downward so as to restrict the increasing rate of the braking pressure on the opposite sided wheel, thereby preventing the accidental spinning phenomena of an automobile.

The fourth embodiment, an hydraulic anti-skid braking system applied to four wheels of an automobile utilizing the second embodiment, has two independent hydraulic circuits connected to a master cylinder; one is an hydraulic circuit for braking the front-left wheel and the rear-right wheel, and the other is an hydraulic circuit for braking the front-right wheel and the rear-left wheel, that is, two wheels braked by each hydraulic circuit are arranged in a diagonal configuration.

The hydraulic circuit braking for two rear wheels shares one common expander chamber and one common piston pump, so do the hydraulic circuit braking for two front wheels.

By above organization, the rate of the pressure increase in the wheel opposite to the slipped wheel is restricted to prevent an automobile from being spun.

It is also possible to carry out a relatively safe braking action even though one of the hydraulic circuits from the master cylinder fails.

Accordingly, the present invention is a very useful one which has the following effects.

The hydraulic anti-skid braking system according to the present invention improves the operating performance of the brake pedal, because the fluid pulses generated by the piston pump are not transmitted to the master cylinder.

And, it prevents the accidental spinning phenomena of automobiles which occur due to different co-efficient of friction between right and left road surfaces because it has the hydraulic circuits for decreasing the braking pressure differential between the right and left wheels.

Further, it is possible to easily add to the hydraulic anti-skid braking system a traction control system which comprises a solenoid valve and an one-way valve and automatically modulates the braking pressure of the automobile because the traction control system can selectively apply the braking pressure to each wheel without the operation of the brake pedal by the driver.

BRIEF DESCRIPTION OF THE DRAWINGS

FIG. 2 is a layout of an hydraulic anti-skid braking system according to the first embodiment;

DESCRIPTION OF THE PREFERRED EMBODIMENTS

Figure 1A:
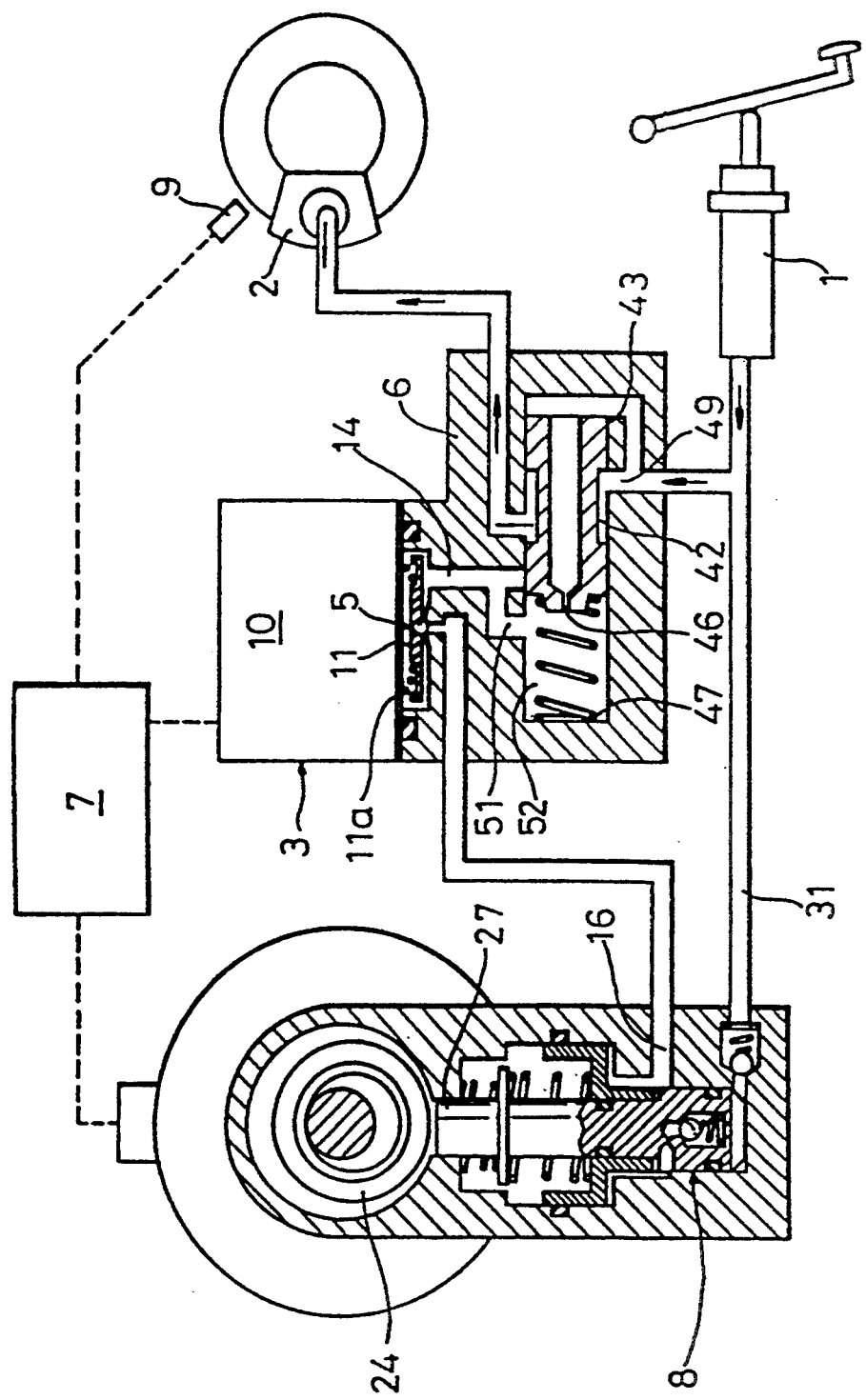
FIG. 1A is a conventional layout of an hydraulic anti-skid braking system in a normal position.
Figure 1B:
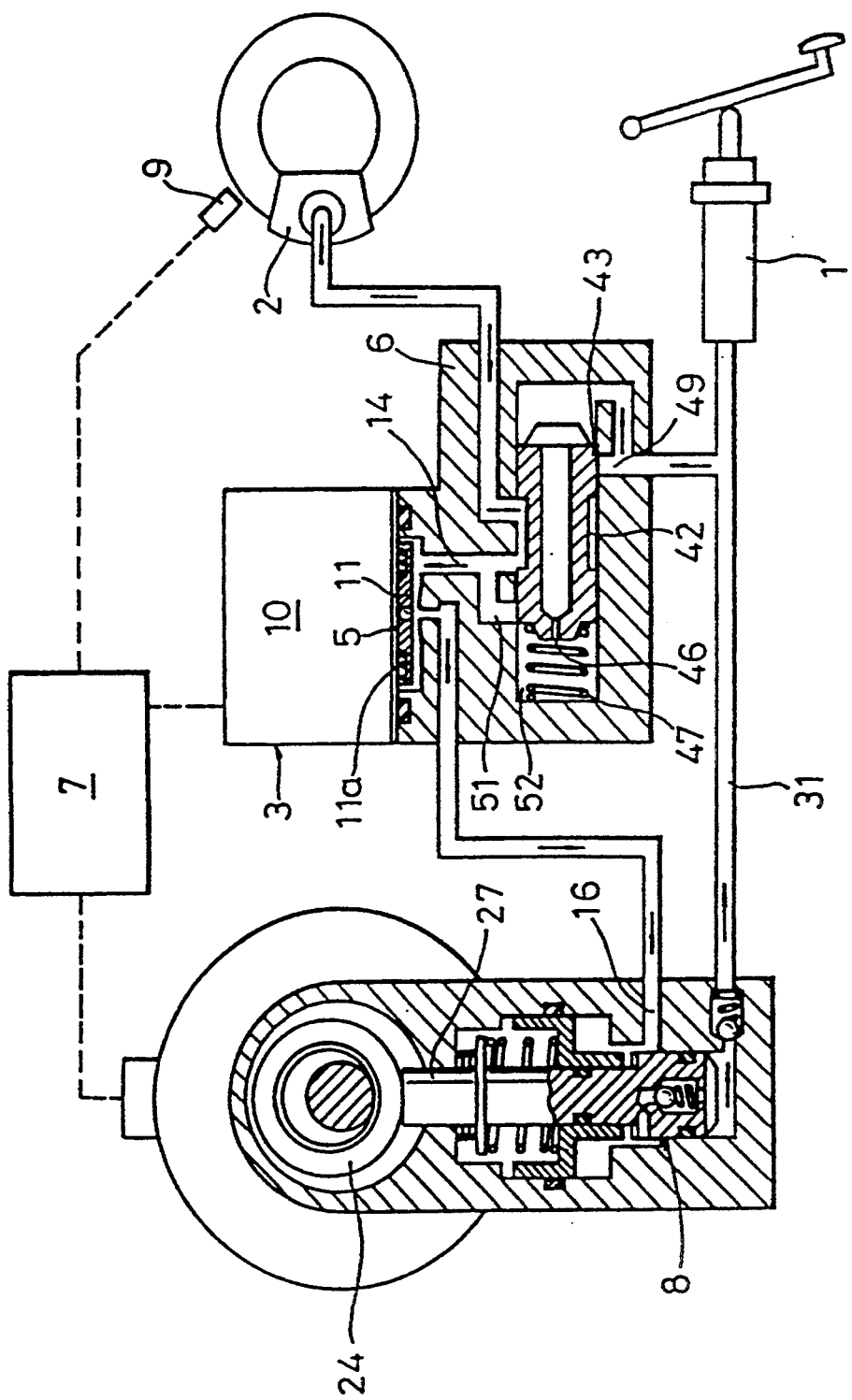
FIG. 1B is a conventional layout similar to FIG. 1A but showing the relative positions of the components when a skid signal is operative.

The first preferred embodiment according to FIG. 2 of the present invention will be described in detail as follows.

FIG. 2 of the present invention shows a layout of an hydraulic anti-skid braking system comprising a master cylinder 1, a brake 2, a flow control valve 3, a solenoid valve 4, a piston pump 5, and an expander chamber 6.

The flow control valve 3 in which a spool 7 combined with a spring 9 is allowed to move up and down in the inside of a housing 8, has a port 13 in communication with the master cylinder 1 on the side of the housing 8, a port 12 in communication with the piston pump 5 over the housing 8, and a fluid passage 31 in communication with the brake 2 in the lower end of the housing 8.

A fluid passage 33 through which fluid from the flow control valve 3 is transmitted to the brake 2 is connected to the solenoid valve 4 through a fluid passage 34 and the master cylinder 1 through an one-way valve 28.

A fluid passage 35 located at the outlet of the solenoid valve 4 is connected to the inlet of the piston pump 5 and the expander chamber 6.

The solenoid valve 4 between the fluid passage 34 and the fluid passage 35 fulfills the function of connecting or isolating two fluid passages 34 and 35 by the movements of a plunger 21 in the solenoid valve 4.

During a normal braking operation of the present invention as described above, the hydraulic pressure generated in the master cylinder 1 is applied to the brake 2 via a fluid passage 30, the port 13 of the flow control valve 3, and the fluid passage 31 in turn because the spool 7 in the flow control valve 3 is placed at the upper side of the housing 8 by the force in the spring 9 and the port 13 is opened.

In this state, if the slip rate of a wheel exceeds a predetermined value, an electric current is initially supplied to a motor 27 driving the piston pump 5.

But, fluid is not immediately directed into the expander chamber 6 because at the initial state the solenoid valve 4 does not open and so the fluid passage 35 directing fluid to the expander chamber 6 is isolated from the master cylinder 1.

Accordingly, the motor 27 runs idle because a pump spring 25 does not push a piston 26.

Where a decrease in the braking pressure is required due to a continuing slip rate, the plunger 21 is moved away from a valve seat 22 by the activation of a solenoid 20 and the fluid passages 34 and 35 are connected to each other.

Hence, fluid in the brake 2 flows to the expander chamber 5 so that the braking pressure in the brake 2 begins to be reduced.

At the same time, fluid discharged by the operation of the pump 5 increases the pressure in a pressure chamber 11 of the flow control valve 3 through a fluid passage 32.

Accordingly, the port 13 is closed by the downward movement of the spool 7, and the connection between the master cylinder 1 and the brake 2 is isolated, thereby accelerating the pressure decrease in the brake 2.

When the pressure in the brake 2 is sufficiently reduced and the slip rate of the wheel is recovered to a normal level, the fluid passages 34 and 35 are isolated from each other by the deactivation of the solenoid 20.

But, at this state, by the discharging of the fluid accumulated in the expander chamber 5, the piston pump 5 continues to operate and the spool 7 moves to a position where balance is maintained by the force in the spring 9 and the pressure differential of both pressure chambers 10 and 11.

Here, the pressure in the brake 2 is steadily increased because flow rate, which is determined by the pressure differential between both pressure chambers 10 and 11 and the size of the orifice 14, continues to be supplied to the brake 2 through the fluid passage 32, the pressure chamber 11, the orifice 14, and the fluid passage 31 in turn.

And, if the fluid in the expander chamber 6 is totally discharged, the pressure applied to the brake 2 becomes equal to that of the master cylinder 1.

Accordingly, the spool 7 is moved upward by the force in the spring 9 so that the system returns back to the normal braking operation.

If the pressure decrease in the brake 2 is required again during the recovery of the braking pressure, it is achieved by a decrease in the pressure caused by the activation of the solenoid 20 and the operation of the piston pump 5 as described above.

If the pressure in the master cylinder 1 is eliminated by the driver, the braking pressure on the wheels is released because the fluid in the brake 2 is immediately transmitted to the master cylinder 1 through the one-way valve 28.

As described above, because the spool 7 in the flow control valve 3 is moved downward and the port 13 in communication with the master cylinder 1 is closed during the modulation of the braking pressure according to the present invention, the fluid pulses generated by the piston pump 5 are not transmitted to the master cylinder 1.

Further, because the internal pressure of a tube 23 in the solenoid valve 4 is maintained equal to that in the brake 2 so that as the pressure in the brake 2 increases, the plunger 21 is pushed in the direction of the valve seat 22, the solenoid valve 4 used for the present invention can more assuredly seal the fluid passages 34 and 35.

Accordingly, another positive effect of this feature allows the size of the solenoid valve 4 to be minimized and allows the solenoid valve 4 to operate at a rapid speed because the spring of the solenoid valve 4 requires only enough force to move the plunger 21.

Figure 3:
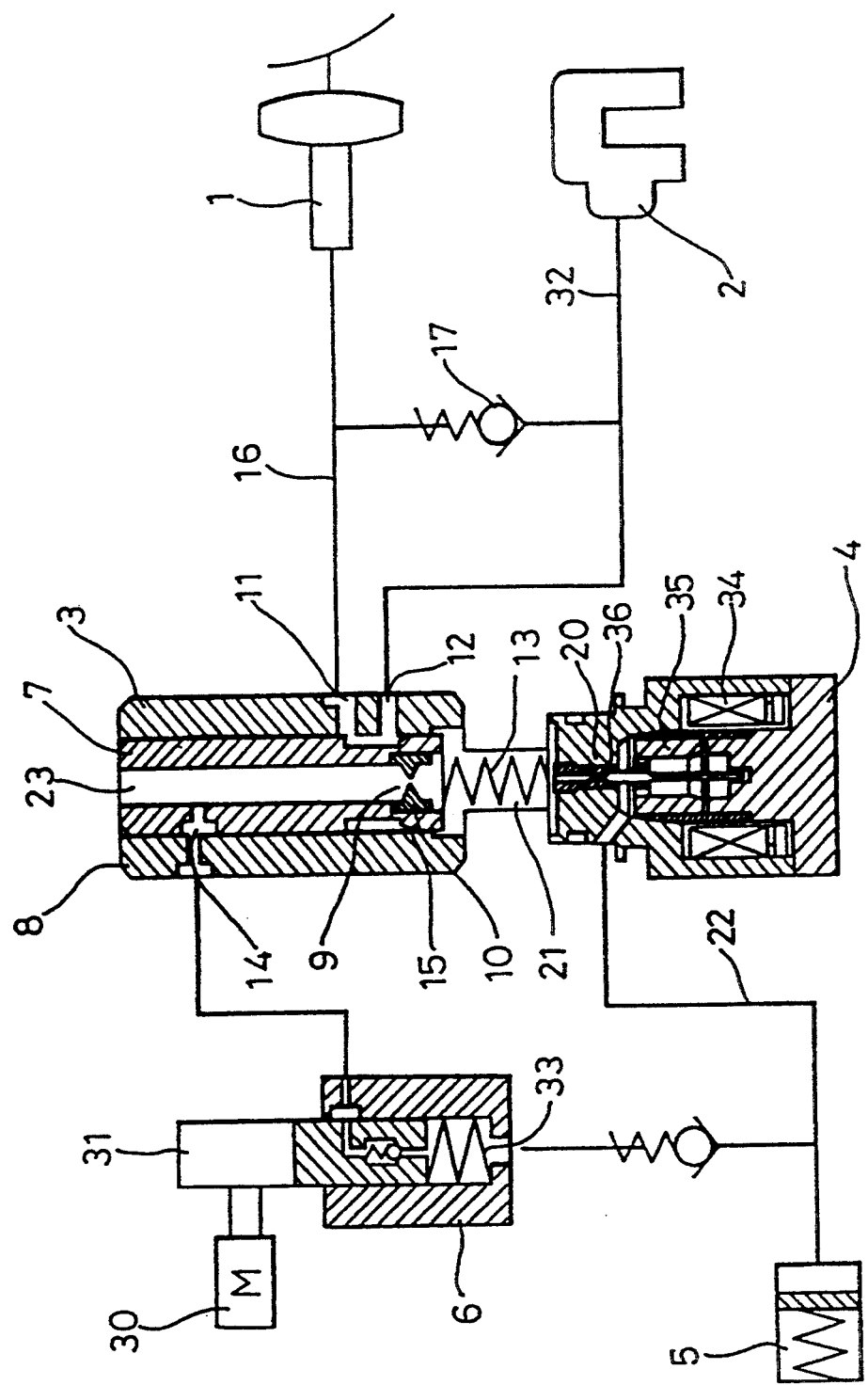
FIG. 3 is a layout of an hydraulic anti-skid braking system according to the second embodiment.

As illustrated in FIG. 3, the second preferred embodiment of the present invention will be described in detail below.

The system comprises a master cylinder 1, a brake 2, a flow control valve 3, a solenoid valve 4, a piston pump 6, and an expander chamber 5.

The flow control valve 3 comprises a housing 8, and a movable spool 7 combined with a spring 13 in the housing 8, and ports 11 and 12 in communication with the master cylinder 1 and the brake 2 respectively on the side of the housing 8, and a port 14 in communication with the piston pump 6 on the upper side of the housing 8, and a pressure chamber 21 integrated with the solenoid valve 4 below the housing 8.

The hydraulic pressure applied in the master cylinder 1 is transmitted to the brake 2 through the ports 11 and 12 on the side of the flow control valve 3.

The solenoid valve 4, integrated with the flow control valve 3, is connected to the inlet of the piston pump 6 and the expander chamber 5 through a fluid passage 22.

Also, the outlet of the piston pump 6 is connected to the port 14 of the flow control valve 3.

During a normal braking operation of the present invention described above, the hydraulic pressure generated in the master cylinder 1 is applied directly to the brake 2 through the ports 11 and 12 in the side of the flow control valve 3 and a fluid passage 32.

At this state, if the slip rate of a wheel exceeds a predetermined value, an electric current is supplied to a motor 30 driving the piston pump 6.

But, fluid is not immediately directed into the expander chamber 5 because at this initial state the solenoid valve 4 is not activated so that the fluid passage 22 is isolated from the master cylinder 1.

Therefore, the piston pump 6 runs idle because a spring 33 in the piston pump 6 does not push a piston 31.

However, when the slip rate continues to increase and the pressure in the brake 2 must be reduced, a plunger 35 in the solenoid valve 4 is moved away from a valve seat 36 when a solenoid 34 is energized and, consequently, the pressure chamber 21 is connected to the fluid passage 22.

Accordingly, fluid in the pressure chamber 21 flows to the expander chamber 5 and then the pressure in the pressure chamber 21 begins to decrease.

At the same time, fluid discharged by the piston pump 6 flows to a pressure chamber 23 through the port 14 and raises the pressure in the pressure chamber 23.

Following the above processes, the port 11 is closed by the descending movement of the spool 7 and the connection between the master cylinder 1 and the brake 2 is isolated and, consequently, the pressure decrease in the brake 2 is accelerated by fluid passing through the port 12 and the spool 7 configured to form a fluid passage gradually enlarged.

If the pressure in the brake 2 is sufficiently reduced and the slip rate is recovered to certain level, the connection between the pressure chamber 21 and the fluid passage 22 is isolated by the deactivation of the solenoid 34.

But even at this state, the spool 7 is moved to a balanced position by the force in the spring 13 and by the pressure differential between both pressure chambers 21 and 23 because the piston pump 5 continues to discharge fluid accumulated in the expander chamber 5 to the flow control valve 3.

It is noted that the pressure in the brake 2 is gradually increased because the flow rate, which is determined by the pressure differential of both pressure chambers 23 and 21 and by the diameter of the orifice 9 positioned between both pressure chambers 23 and 21, continues to increase the braking pressure through the pressure chambers 23 and 21 and the port 12 and the fluid passage 32 in turn.

When the fluid in the expander chamber 5 has been completely discharged, the pressure in the brake 2 becomes equal to that in the pressure chamber 23 and the spool 7 is moved upward by the spring 13 and the system returns to the normal braking operation.

If a decrease in the pressure in the brake 2 is required again during the recovery of the braking pressure, the system converts to the pressure decrease mode with the activation of the solenoid 34 and the operation of the piston pump 6 as described above.

If the pressure in the master cylinder 1 is eliminated by the driver, the braking pressure is released because the fluid in the brake 2 is immediately returned to the master cylinder 1 through an one-way valve 17.

In this manner, the fluid pulses generated by the piston pump 6 are not transmitted to the master cylinder 1 because the spool 7 in the flow control valve 3 moves downward and closes the port 11 connecting the master cylinder 1 to the brake 2 during the modulation of the braking pressure according to the present invention.

Figure 4:
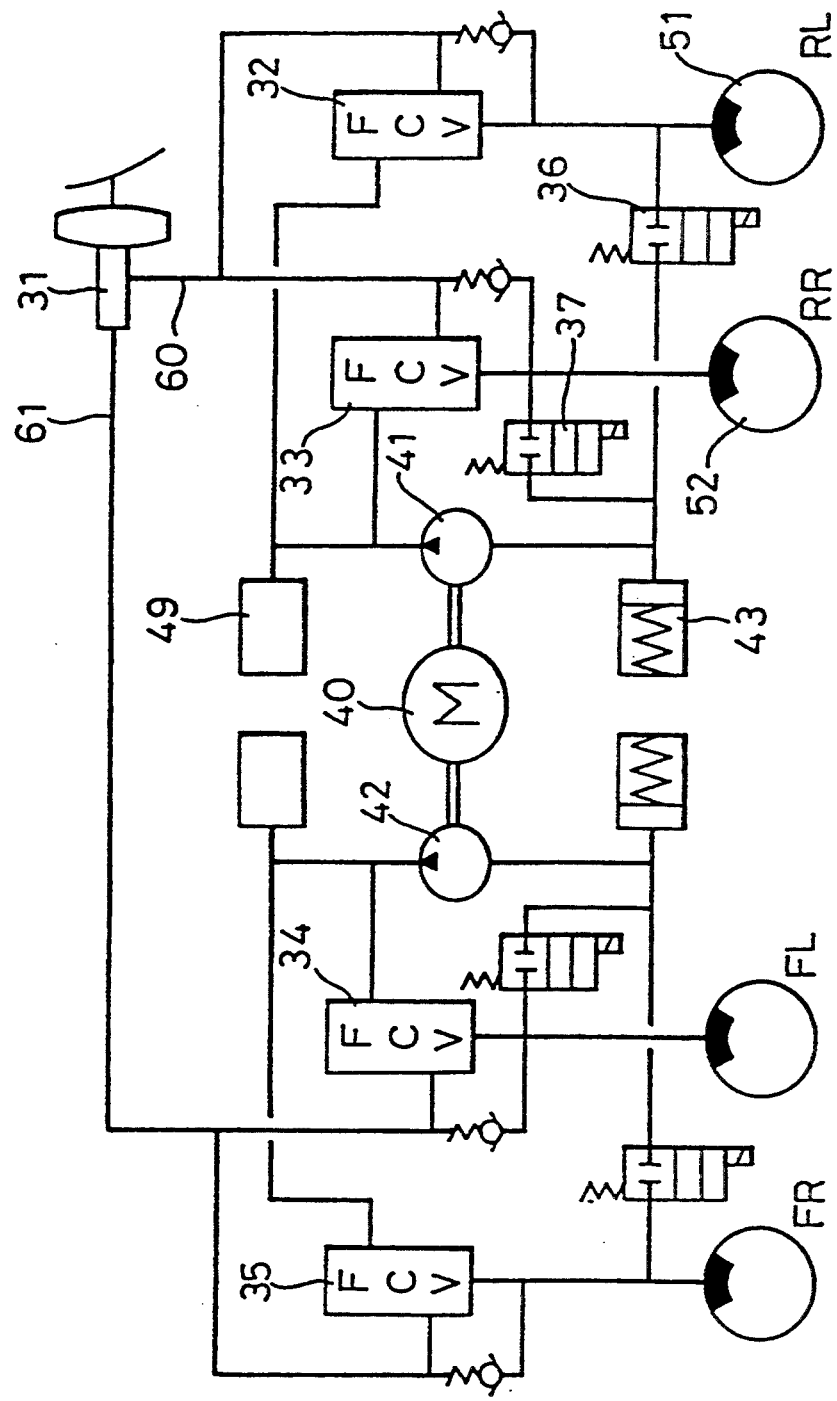
FIG. 4 is a schematic drawing showing an entire hydraulic anti-skid braking system applied to an automobile according to the first embodiment.

FIG. 4 is another preferred embodiment which organizes an hydraulic anti-skid braking system for automobiles utilizing the first embodiment of FIG. 2 and in which the hydraulic pressure generated in a master cylinder 31 is applied to flow control valves 32, 33, 34, and 35 through two independent fluid passages 60 and 61 braking the front right and left wheels, and the rear right and left wheels respectively.

Here, the flow control valves 32, 33, 34 and 35 have the same configuration as the flow control valve 3 illustrated in FIG. 2.

As illustrated in FIG. 4, because solenoid valves 36 and 37 hold in common an expander chamber 43, a piston pump 41 and a chamber 49 for decreasing the pressure pulsation, the accidental spinning phenomena of automobiles caused by the rapid braking pressure differential between right and left wheels is prevented.

For example, where the rear-right wheel as illustrated in FIG. 4 slips due to the low co-efficient of the friction in the right road surface with respect to the automobile, fluid is directed into the expander chamber 43 by the activation of the solenoid valve 37 and the operation of the piston pump 41 in order to reduce the hydraulic pressure applied to a brake 52 of the rear-right wheel.

As the spools of the two flow control valves 32 and 33 are moved downward by the operation of the piston pump 41, the pressure in the brake 52 is decreased and the rate of the pressure increase in a brake 51 is restricted.

Figure 7A:
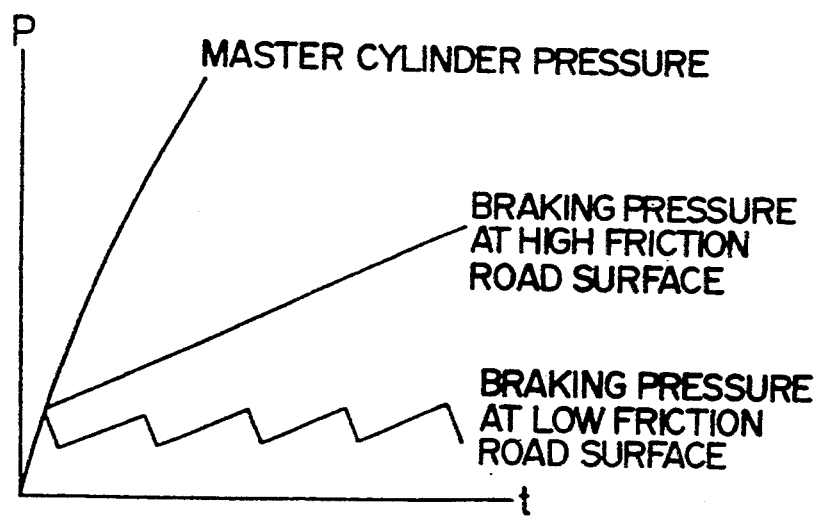
Figure 7B:
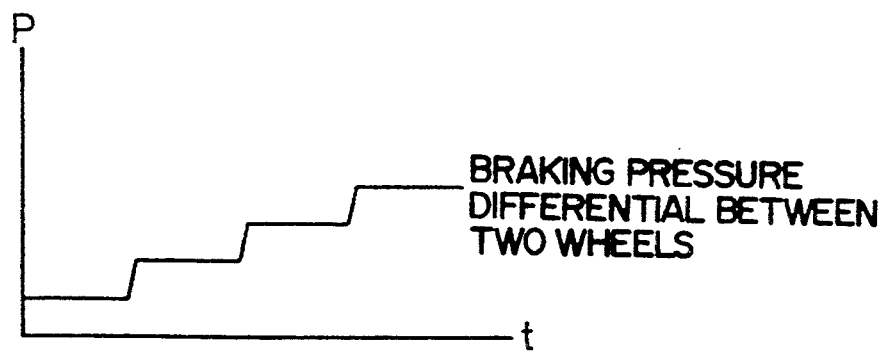

Accordingly, as illustrated in FIG. 7, the safety of a automobile having the hydraulic anti-skid braking system according to the present invention is assured because the braking pressure differential between the right and left wheels is not abruptly increased.

Likewise, where the braking pressure of the rear-left wheel is decreased, the increase rate of the braking pressure in the rear-right wheel is restricted.

The fluid passage 61, one of two fluid passages 60 and 61 through which the hydraulic pressure generated in the master cylinder 31 is transmitted to each brake, is designed to produce the same effect as that described above with regard to the front-right and the front-left wheels.

A motor 40 drives two piston pumps 41 and 42 making use of an eccentric cam and the piston pumps 41 and 42 are independently connected to the braking system for the two front wheels and the braking system for the two rear wheels respectively.

Figure 5:
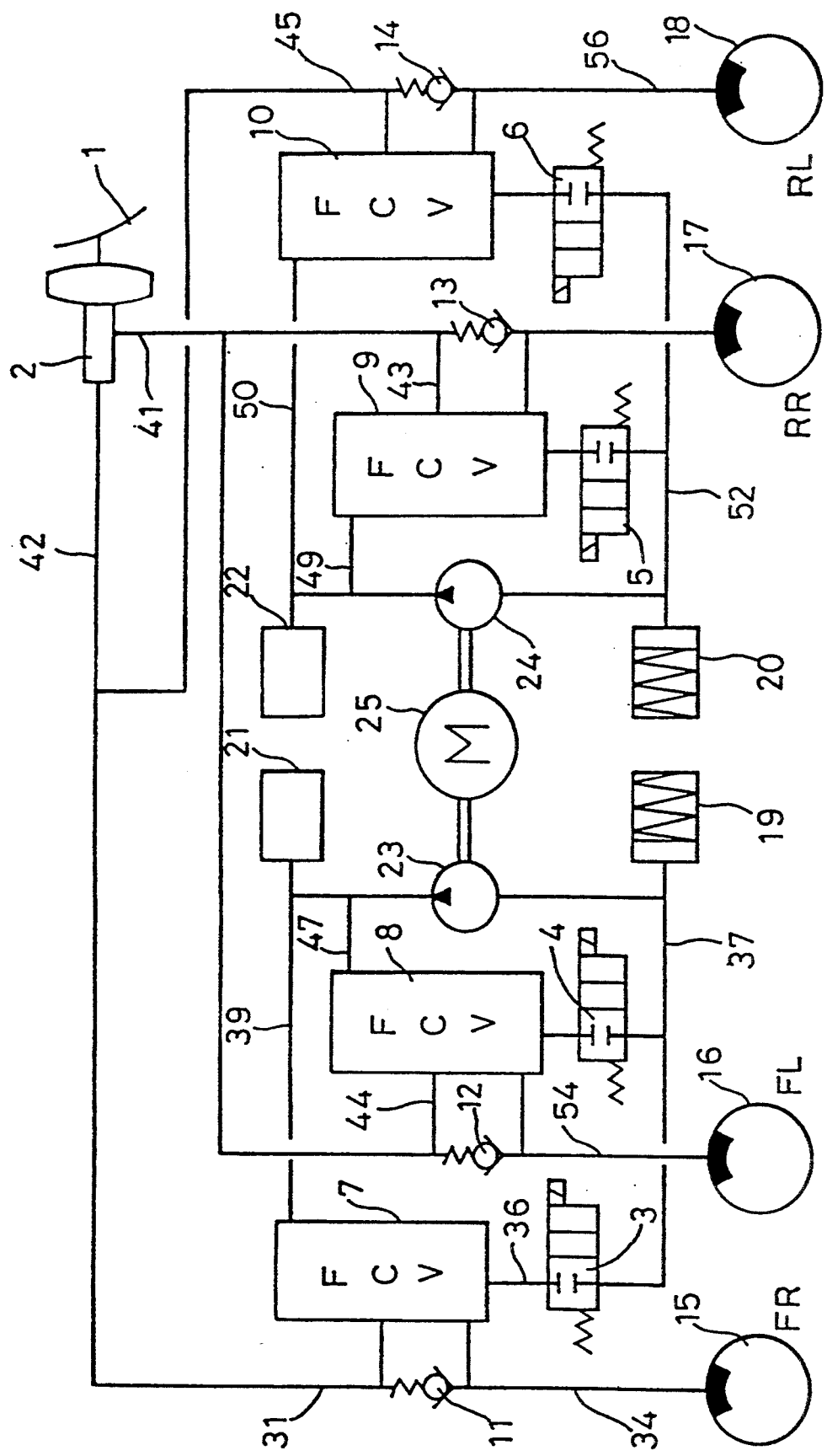
FIG. 5 is a schematic drawing of an entire hydraulic anti-skid braking system applied to an automobile according to the second embodiment.

FIG. 5 is another preferred embodiment which organizes an hydraulic anti-skid braking system for automobiles utilizing the second embodiment in FIG. 3.

In the system, the hydraulic pressure produced in a master cylinder 2 is applied to flow control valves 7, 8, 9 and 10 which have the same configuration as the flow control valve 3 illustrated in FIG. 3, through two independent fluid passages 41 and 42, braking the front-left and the rear-right wheels, and the front-right and the rear-left wheels respectively, that is, two wheels connected to each fluid passage are arranged in a diagonal configuration.

As a result of that organization, it is possible to carry out a relatively safe braking operation even though one of the two fluid passages 60 and 61 from the master cylinder 2 fails and the braking pressure differential between the right and left wheels is restrained from abruptly increasing so as to avoid the spinning of the automobile as illustrated in FIG. 7.

Figure 6:
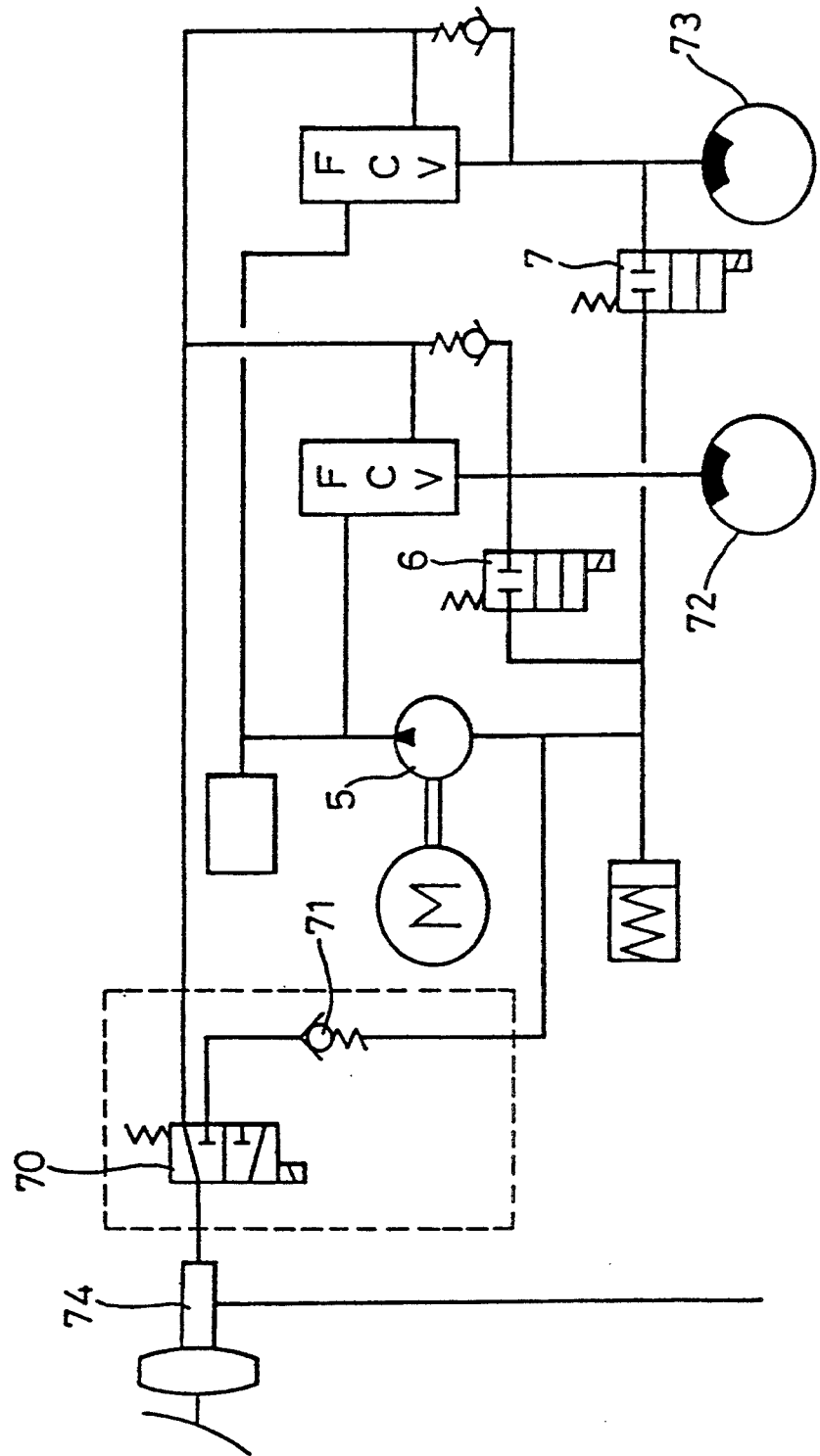
FIG. 6 is a partial layout of an hydraulic anti-skid braking system added a device to fulfill a traction control function; and, FIGS. 7A and 7B are graphs of the brake-applying pressure, and the pressures applied to respective wheel brakes with the automobile travelling over a split coefficient of road surface frictions.

FIG. 6 is another preferred embodiment showing a hydraulic anti-skid braking system added a traction control system.

In the system, a solenoid valve 70 and an one-way valve 71 as shown in the dotted line are added to the hydraulic anti-skid braking system of the present invention so that the system carries out all the functions the same as those of the system illustrated in FIG. 4 and FIG. 5 with the solenoid valve 70 being de-energized.

On the other hand, by activating the solenoid valve 70 the system can carry out the traction control function which is able to provide the braking pressure without the operation of the brake pedal by the driver.

As described above, the traction control function for automatically modulating the braking pressure of a automobile at accelerating movements and thereby improving the road-holding ability is possible, which permits braking pressure without the operation of the brake pedal by the driver to be selectively applied to each wheel by the operation of the piston pump 5 and the opening and closing of the solenoid valves 6, 7, and 70 which is added to the system.

What is claimed is:
1. An anti-skid braking system comprising:
 a. a master cylinder;
 b. a brake cylinder;
 c. a flow control valve;
 d. an anti-lock valve having a closed position for a normal braking mode, and an open position for an anti-lock operating mode;
 e. expander means defining an expansion chamber to receive brake fluid;
 f. a pump operable in said anti-lock operating mode to draw brake fluid from said expander means and from said anti-lock valve, and to pump said brake fluid from a pump outlet to said control valve;
 g. said flow control valve comprising:
  i. a valve housing having a housing side wall;
  ii. a spool member mounted in said housing for sliding movement between a first normal braking position and a second anti-lock position;
 h. said spool member having an interior surface defining a spool chamber and having an orifice in said spool chamber defining a first pressure area above said orifice and a second pressure area below said orifice, with movement of said spool member to the anti-lock position being due to a pressure differential between said first pressure area and said second pressure area, which pressure differential resulting from opening of said anti-lock valve and operation of said pump;
 i. said housing having a first inlet port to receive brake fluid from said pump outlet;
 j. said spool member having a spool inlet port opening into the first pressure area of said spool chamber, said spool inlet port being positioned so that:
  i. with said spool member in the first normal braking position, the spool inlet port is aligned with the first housing inlet port to permit flow of brake fluid from the pump, through the first housing inlet port and through the spool inlet port into the first pressure area of the spool chamber, and
  ii. with the spool member in the second anti-lock position, the spool inlet port is out of alignment with the first housing inlet port to block flow of brake fluid into the first pressure area of the spool chamber;
 k. said housing having a second housing inlet port connected to said master cylinder and a housing outlet port connected to said brake cylinder;
 l. said spool member having a connecting passage which is at a side wall of said spool member and is isolated from said spool chamber, said connecting passageway being configured and positioned so that
  i. with the spool member in the first normal braking position, the connecting passageway connects the second housing inlet port with the housing outlet port so that there is a direct connection between the master cylinder and the brake cylinder, with said connecting passage being isolated from said spool chamber, and
  ii. with said spool member in the second anti-skid position, the connecting passage is moved out of alignment with said second housing inlet port so that said spool member blocks said second housing inlet port, and said housing outlet port is opened to a passageway connected to said anti-lock valve,
wherein with the anti-skid braking system in the normal braking mode, said master cylinder and said braking cylinder are isolated from said spool chamber, and with said anti-skid braking system in the anti-skid operating mode, the master cylinder is still isolated from the spool chamber and is also isolated from the brake cylinder, and the brake cylinder is in communication with said anti-lock valve so that fluid from said brake cylinder is able to flow to said expander means and to said pump.

2. The system as recited in claim 1, wherein said pump is a piston pump.

3. The system as recited in claim 1, wherein said anti-lock valve is a solenoid valve.

4. The system as recited in claim 1, wherein said flow control valve and said anti-lock valve are connected to one another and define said second pressure area that is below said orifice.

5. The system as recited in claim 1, wherein said spool has a lengthwise axis, and said connecting passage is formed parallel to said lengthwise axis.

6. The system as recited in claim 5, wherein said connecting passage is formed as a continuous recess in an exterior surface of said spool member.

7. The system as recited in claim 6, wherein said connecting passage is formed circumferentially around the side surface of said spool member.

8. The system as recited in claim 1, wherein there is a spring means positioned to urge said spool member from the anti-lock position to the normal braking position.

9. The system as recited in claim 8, wherein said spring means is positioned in said second pressure area.

10. The system as recited in claim 1, wherein there is a check valve interconnecting said master cylinder and said brake cylinder, to permit flow from said brake cylinder to said master cylinder, but to prevent flow from said master cylinder through said check valve to said brake cylinder.

11. The system as recited in claim 1, wherein:
a. said flow control valve and said anti-lock valve are connected to one another and define said second pressure area that is below said orifice;
b. wherein spring means is positioned to urge said spool member from the anti-lock position to the normal braking position and said spring means is positioned in said second pressure area.

12. The system as recited in claim 1, wherein:
a. said pump is a piston pump;
b. said anti-lock valve is a solenoid valve;
c. there is a check valve which interconnects said master cylinder and said brake cylinder to permit flow from said brake cylinder to said master cylinder, but to prevent flow from said master cylinder through said check valve to said brake cylinder.

* * * * *